United States Patent [19]

Brown

[11] Patent Number: 4,556,377
[45] Date of Patent: Dec. 3, 1985

[54] SELF-CENTERING ARRANGEMENT FOR COACTING FORMING TOOLS

[75] Inventor: Paul P. Brown, Orangeville, Canada

[73] Assignee: Husky Injection Molding Systems Ltd., Bolton, Canada

[21] Appl. No.: 583,132

[22] Filed: Feb. 24, 1984

[51] Int. Cl.[4] .............................................. B23B 7/06
[52] U.S. Cl. .................................... 425/138; 425/574; 425/575; 249/68; 249/155
[58] Field of Search ................. 249/155, 68; 264/40.5, 264/328.11; 425/138, 168, 468, 574, 575

[56] References Cited

U.S. PATENT DOCUMENTS 4,179,254 12/1979 Brown ................................... 249/68

Primary Examiner—Jay H. Woo
Assistant Examiner—Timothy W. Heitbrink
Attorney, Agent, or Firm—Karl F. Ross; Herbert Dubno

[57] ABSTRACT

An injection mold with a female mold portion and a male mold portion has a locking ring which closely surrounds one mold portion and has a beveled inner centering surface coacting in a mold-closed position with a complementarily beveled outer centering surface of the other mold portion for properly aligning the two mold portions with each other. The locking ring and the mold portion surrounded thereby form an assembly mounted on a backing plate by means of bolts screwed into that assembly, the bolts having heads bearing upon spacing sleeves which abut the assembly and are received with some clearance in a bore of the backing plate. The sleeves project from the bores of the backing plate to provide room for one or more Belleville springs acting upon the bolt heads to keep the sleeves under pressure. The bolts, sleeves and springs, being thus rigidified with the assembly of mold portion and locking ring, are slightly shiftable relatively to the backing plate within the clearance of their bores for automatically compensating disalignments due for example to thermal causes. The locking ring may be separable from the associated mold portion in a mold-open position to entrain a stripper ring coupled therewith; otherwise the stripper ring may be movable relatively to the assembly by actuating rods traversing the backing plate. The locking ring may be replaced by wedge pieces.

17 Claims, 8 Drawing Figures

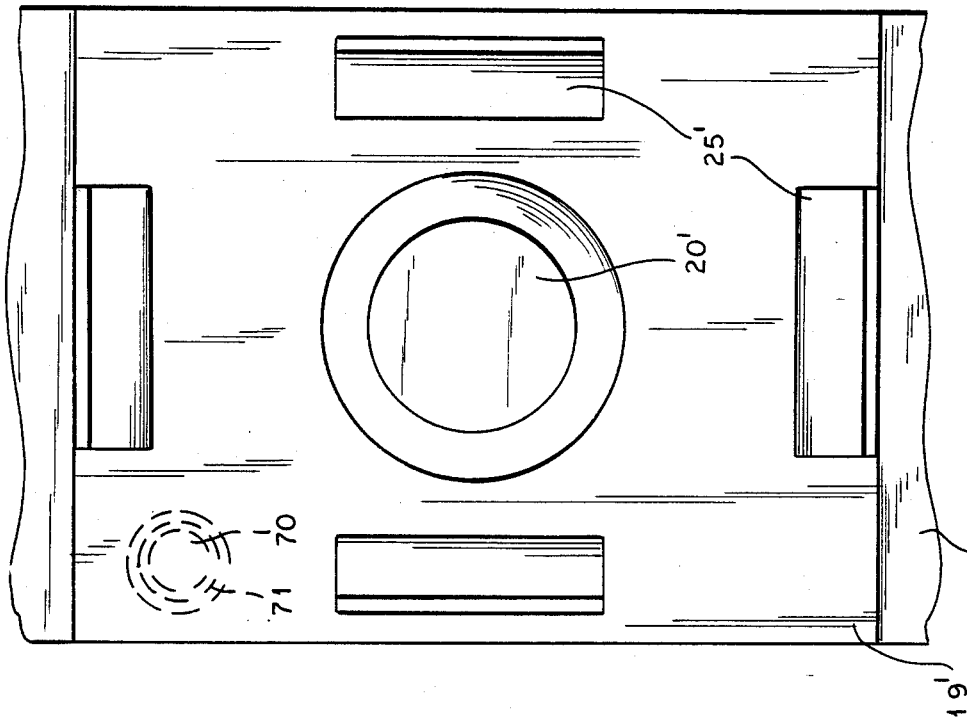
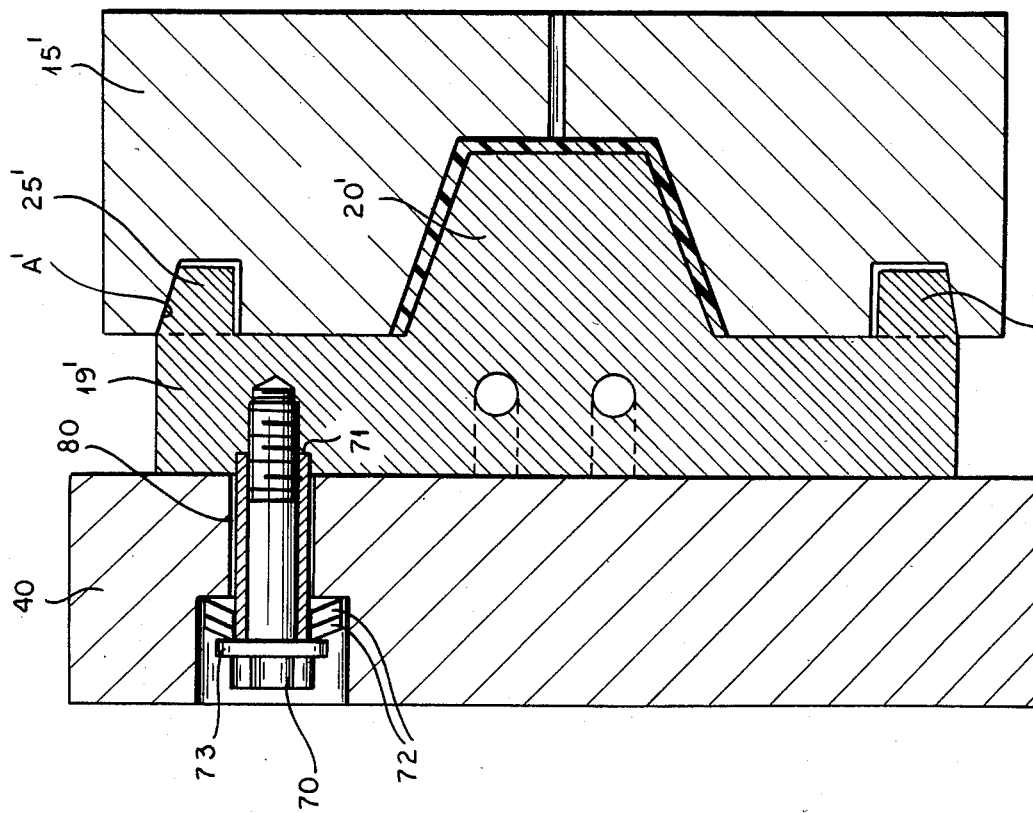

4,556,377

SELF-CENTERING ARRANGEMENT FOR COACTING FORMING TOOLS

FIELD OF THE INVENTION

My present invention relates to a mounting of a pair of coacting forming tools, such as mold portions of a molding machine or dies of a stamping press, carried on respective platens to define a cavity in a closure position, one forming tool being provided with one or more locking elements having beveled centering surfaces engaging a complementarily beveled centering surface of the other forming tool for properly aligning the two forming tools with each other upon closure. The combination of the locking element or elements with the associated forming tool can therefore be termed a centering assembly.

BACKGROUND OF THE INVENTION

An injection-molding machine provided with such a centering assembly is the subject matter of my commonly owned prior U.S. Pat. No. 4,179,254. More particularly, the injection mold described and shown in that patent has a male portion with a tapering core surrounded by a locking ring; this male portion and a coacting female portion on the other platen serve to produce a cup-shaped workpiece which adheres to the core when the mold opens and is dislodged therefrom by a stripper ring also surrounded by the locking ring. According to a mold structure referred to as prior art in that earlier patent, the assembly of male mold portion and locking ring remains intact when the mold opens while the stripper ring is displaceable relatively to that assembly by actuating rods traversing the base of the core. According to another structure, embodying the invention claimed in that prior patent, the locking ring is separable from the male mold portion in the mold-open position and is coupled with the stripper ring for joint displacement therewith under pressure of an adjacent stripper plate.

U.S. Pat. No. 4,179,254 does not give details on the manner in which the two mold portions are secured to their respective platens. According to conventional practice, the female mold portion is solidly mounted on a backing plate—as by being closely fitted into a depression thereof—while the assembly of male mold portion and locking ring is initially attached to a similar plate with a loose fit, with the aid of hand-tightened screws passing through wider bores in the plate, so as to be laterally shiftable relatively thereto. Upon a preliminary mold closure, which brings about the proper alignment of the male and female portions, the screws are further tightened to immobilize the core and the associated locking ring on its backing plate. This procedure is rather time-consuming and does not prevent subsequent misalignment during operation, e.g. by thermal causes due to unavoidable temperature differences.

This problem is especially serious when the workpieces to be molded are thin-walled cups whose walls would be severely weakened by an offset between the axes of the core and the outer cavity wall. Corrective measures to be taken upon interruption of a production run are especially laborious in a multicavity model requiring individual adjustment of each core and associated locking ring.

Similar problems can arise in die stamping of workpieces such as coins confined in a closed space during the stamping operation.

OBJECT OF THE INVENTION

The object of my present invention, therefore, is to provide an improved mold or die structure obviating this disadvantage.

SUMMARY OF THE INVENTION

In accordance with my present invention, an assembly of first forming tool and adjoining locking means is supported on a backing plate with limited lateral relative shiftability by fastening means comprising a plurality of bolts each passing with clearance through a respective bore in that plate and engaging the assembly with a tight fit, these bolt projecting from a surface of the plate remote from that assembly and having heads which are separated from this plate surface by resilient means—preferably one or more Belleville springs—tending to draw the assembly onto the backing plate.

If the principal components of the assembly (i.e. the locking means and the adjoining forming tool) are both in contact with the backing plate, each of these components may be fastened to that plate by a respective set of spring-loaded bolts as described above. In cases where a ring serving as the locking means is separated from the backing plate by a base portion of a mold portion carrying a core, a single set of bolts can be used to engage the ring after passing through that base portion if the relative position of the core and the locking ring is to remain unchanged through the mold cycle. If, however, the locking ring is to become separated from the associated mold portion in the mold-open position for the entrainment of a stripper ring, with the aid of a mobile stripper plate interposed between the locking ring and the backing plate, a different set of spring-loaded bolts similar to those used on the backing plate may serve to connect the locking ring to the stripper plate with limited relative lateral shiftability.

The tight fit between the bolts and the forming tool or the locking means engaged thereby can be established in various ways. The simplest way is to dimension the screw-threaded end of each bolt and/or the threaded part of a counterbore receiving that end in such a manner that the bolt head is still sufficiently spaced from the confronting plate surface when the bolt is fully driven home, i.e. when it has been tightened as far as it goes. I prefer, however, to surround each bolt with a spacing sleeve of suitable length which is compressed between the bolt head and a face of the assembly so as to resist further tightening by its compressive strength and to prevent loosening by the frictional contact of its ends with the head and with the engaged face. The use of such sleeves offers greater flexibility in the compensation of tolerance and also has further advantages that will become apprent hereinafter.

BRIEF DESCRIPTION OF THE DRAWING

The above and other features of my invention will now be described in detail with reference to the accompanying drawing in which:

FIG. 7 is another view similar to part of FIG. 1, showing a different centering assembly; and FIG. 8 is an elevational view of the assembly shown in FIG. 7.

SPECIFIC DESCRIPTION

Figure 1:
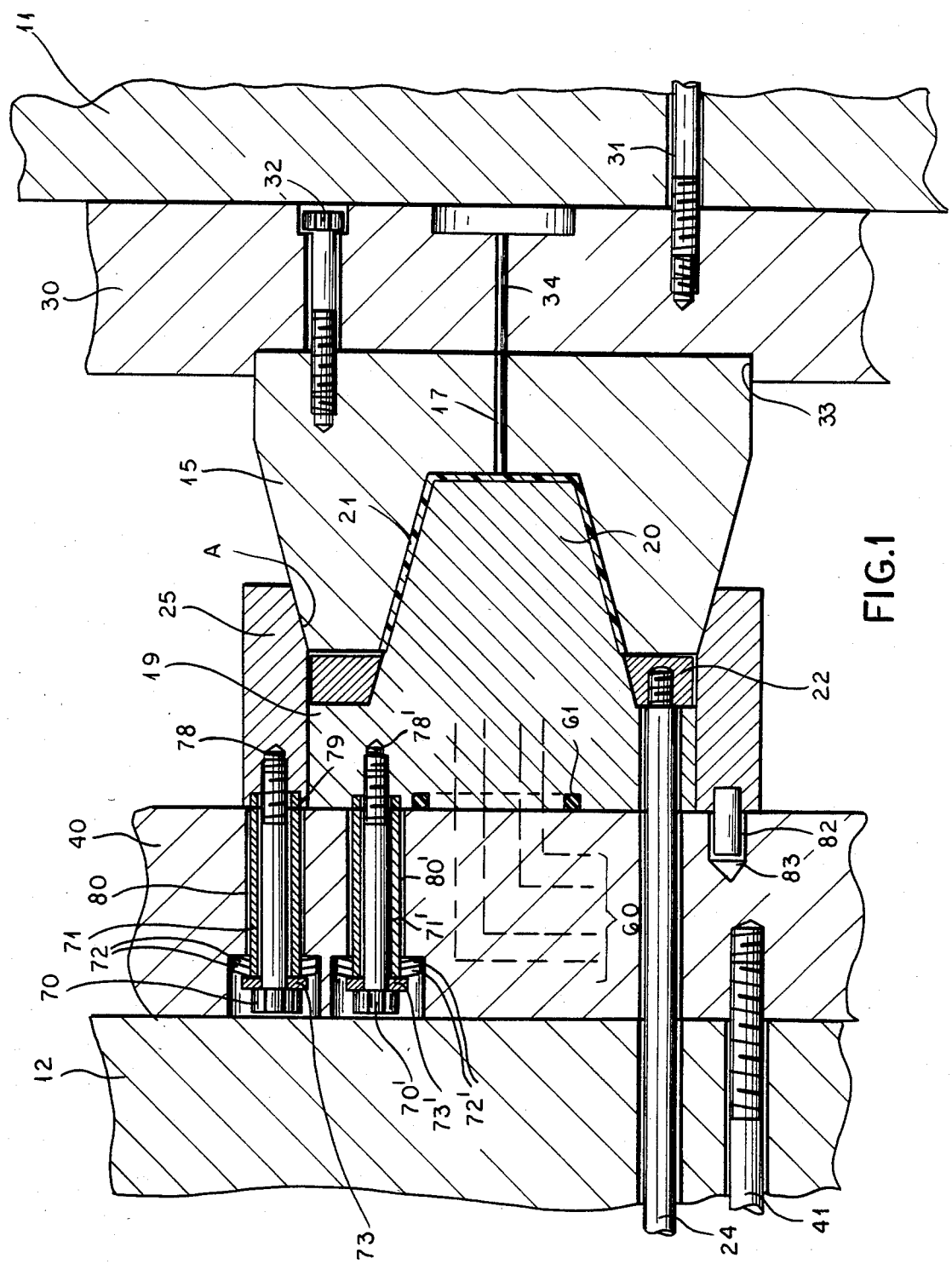
FIG. 1 is a cross-sectional view of the essential portions of an injection mold embodying this invention.

FIG. 1 shows a mold for an injection-molding machine having a stationary platen 11 and a movable platen 12 interconnected by nonillustrated tie rods, as described and illustrated in my abovementioned U.S. Pat. No. 4,179,254. Platen 11 carries a backing plate 30 which is fixedly secured thereto by screws 31 and, with the aid of similar screws 32, is connected with a female mold portion 15 bounding a cavity for the production of cup-shaped workpieces 21; for simplicity's sake, only one such screw has been shown in each instance. Mold portion 15 is immovably seated in a depression 33 of plate 30 and has a channel 17 communicating with an injection orifice 34. The outer periphery of this mold portion is beveled and is engageable by a complementarily beveled inner centering surface A of a locking ring 25 which is carried on platen 12 through the intermediary of a backing plate 40. The latter plate further supports a male mold portion comprising a frustoconical core 20 which in the illustrated mold-closed position defines the inner surface of the thin-walled workpiece 21. A stripper ring 22, seated on a base 19 of core 20, is in loose contact with the surrounding elements and is threadedly connected with several actuating rods 24 (only one shown) passing with clearance through aligned bores of platen 12, backing plate 40 and core base 19.

Plate 40 and mold portion 19, 20 contain channels, partly indicated in dotted lines at 60, for the circulation of cooling water therethrough. Sealing rings 61 (only one shown) prevent water leakage along the contact surfaces of plate 40 and base 19. Similar cooling channels and sealing rings are conventionally provided in mold portion 15 and its backing plate 30 but have not been illustrated. Screws 41, only one of which is shown, fixedly hold the plate 40 onto platen 12.

Mold portion 19, 20 and locking ring 25 are separately secured, via respective sets of bolts 70, 70' (only one shown in each instance), to backing plate 40. The bolts 70 and 70' have heads countersunk in recesses 69, 69' of a surface of plate 40 remote from assembly 19, 20, 25; the stems of these bolts have threaded extremities screwed into threaded bores 78, 78' of ring 25 and base 19, respectively. The bold heads bear, through the intermediary of respective washers 73 and 73', upon spacing sleeves 71 and 71' whose opposite ends abut the ring 25 and the base 19, respectively; bores 80, 80' of plate 40, whose length is somewhat less than that of the sleeves 71 and 71', are traversed with clearance by these sleeves which therefore project together with the associated bolts from the bottoms of their recesses to provide space for respective stacks of Belleville springs 72, 72' that are compressed between the recess bottoms and the washers 73, 73'. It will be understood that these washers could be integral with the corresponding bolt heads.

Springs 72 and 72' are under sufficient stress to draw the ring 25 and the base 19 into close contact with plate 40 while still letting that assembly, rigidified with fastening means 70-73 and 70'-73', be shifted laterally along plate 40 when at the instant of mold closure the beveled surfaces of mold portion 15 and locking ring 25 are not precisely aligned with each other. Naturally, the possible lateral displacement of the locking ring and the core with reference to backing plate 40 should not be so large as to allow for a disalignment which would let the end face of the cavity wall strike the opposite face of the locking ring as the mold closes.

As further seen in FIG. 1, spacing sleeve 71—representative of several such sleeves—projects into a recess 79 of locking ring 25 in which its end is received with close fit so that these sleeves can serve as locators during the initial installation of the mold on the platens. With all sleeves 71 inserted into their recesses so as to project rearwardly from locking ring 25, and with backing plate 40 slipped onto them, bolts 70 need only be screwed loosely into their threaded bores 78 with their heads bearing lightly upon springs 72 so that sleeves 71 are not yet under pressure. Bolts 70' may be similarly pretightened after being partly screwed into their threaded bores 78'. The automatic alignment of the mold portions in their closure position can then be firmed up (after a reopening of the mold and detachment of plate 40 from platen 12) by further tightening the bolts 70 and 70' to the extend permitted by the resistance of sleeves 71 and 71'. This will prevent any untimely separation of locking ring 25 and mold portion 19, 20 from backing plate 40 but will still allow a certain relative shifting during subsequent operation if and when temperature differences should necessitate an automatic realignment as the mold closes.

If manufacturing tolerances should result in too loose a fit between mold portion 15 and centering surface A, thereby unduly reducing the wall thickness of workpiece 21 by letting that portion penetrate too deep into the ring 25 when the mold is clamped shut, such defect can be remedied by grinding off a small portion of base 19 at its face adjoining the plate 40; this will merely require a suitable retightening of bolts 70' upon their reinsertion into threaded bores 78' in order to let the sleeves 71' contact the ground-off face under the requisite pressure.

Figure 2:
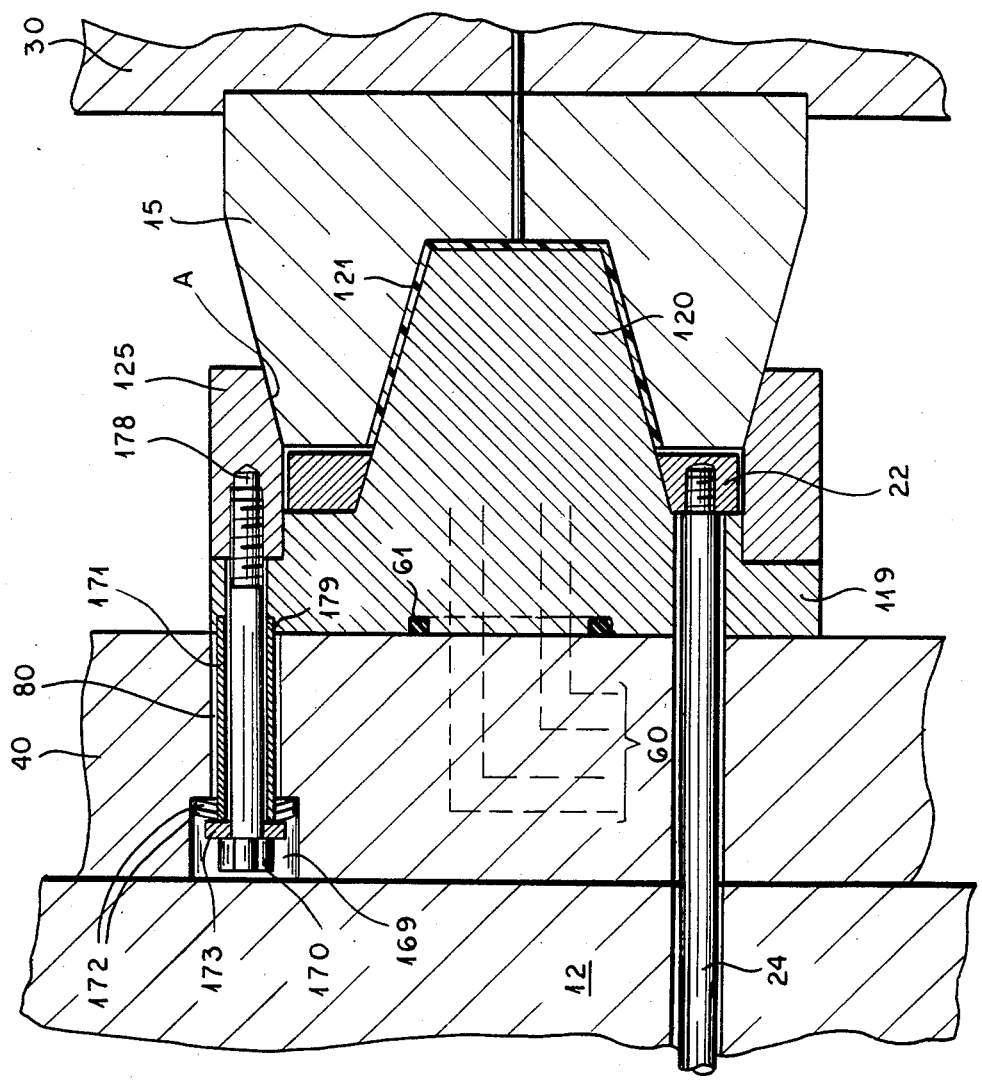
FIGS. 2, 3 and 4 are views similar to FIG. 1, illustrating respective modifications.

The modified injection mold shown in FIG. 2 differs from that of FIG. 1 in that the core 120 of the male mold portion has a core base 119 supporting a locking ring 125 of reduced height. The core base has apertures traversed by fastening bolts 170 (only one shown) which are screwed into threaded bores 178 of ring 125. As in the previous embodiment, throughgoing bores 80 of plate 40 accommodate spacing sleeves 171, surrounding the respective bolts 170, with enough clearance to enable a limited lateral shifting as already described; each sleeve 171 is received in a recess 179 of core base 119, constituting an enlargement of the respective bore 178, to serve as a locator during initial installation. As before, the head of each bolt 170 bears through a washer 173 upon a stack of Belleville springs 172 which rests against the bottom of a recess 169 in the rear surface of backing plate 40 to draw the assembly of locking ring 125 and mold portion 119, 120 onto that backing plate.

In this instance, an unduly loose fit between female mold portion 15 and the centering surface A of locking ring 125 would have to be remedied by the interposition of a thin shim between the ring and the base 119 of the male mold portion.

Figure 3:
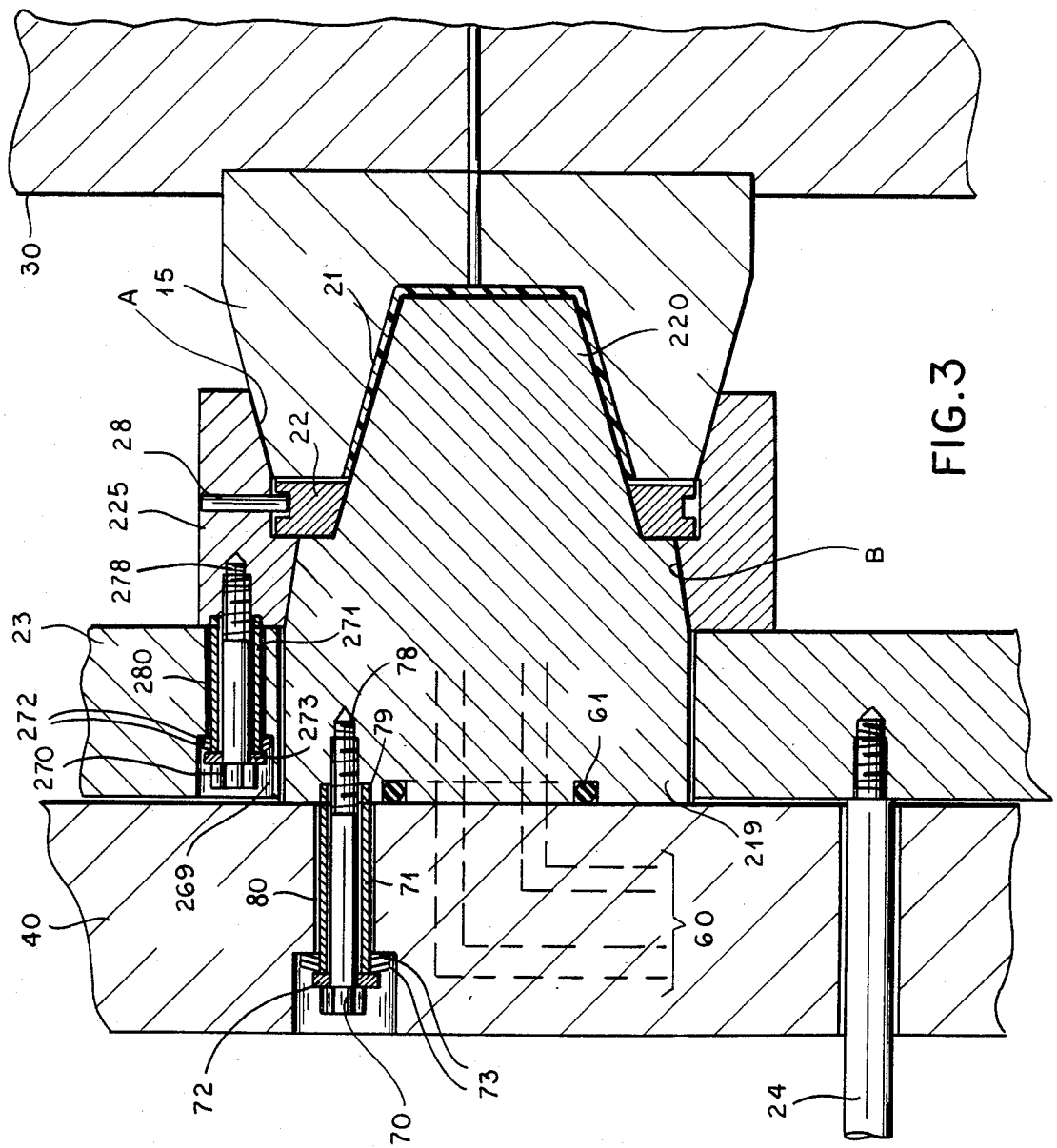

FIG. 3 shows another modification wherein the core 220 has a cylindrical base 219 of reduced diameter surrounded by a stripper plate 23 to which the actuating rods 24 are attached. A locking ring 225, resting on stripper plate 23, is coupled with stripper ring 22 by pins 28 (only one shown) projecting into a radial groove of the stripper ring; locking ring 225 further has a second beveled centering surface B, converging toward female mold portion 15 in contrast to surface A, engaging another surface area of core 220.

In this embodiment, fastening bolts 270 pass through bores 280 of stripper plate 23 and are screwed into threaded bores 278 of locking ring 225 for holding same firmly against plate 23. The heads of bolts 270 are received in recesses 269 of plate 23 and, in the aforedescribed manner, bear upon a stack of Belleville springs 272 through washers 273. Each bolt 270 is surrounded by a spacing sleeve 271 received with clearance in the respective bore 280.

Fastening devices 270 - 273 are virtually identical, except for dimensional differences, with similar devices 70 - 73 fixedly secured to core base 219 in order to hold same with limited relative shiftability onto plate 40. While the position of plate 23 with reference to ring 225 is not critical in a single-cavity mold, the relative adjustability of plate 23 is of value when that plate is common to a plurality of locking-ring/core assemblies that are independently shiftable on plate 40.

Thus, in the closure position of the mold shown in FIG. 3, the assembly of locking ring 225 and mold portion 219, 220 are relatively immovable and jointly displaceable with reference to backing plate 40. When the mold is opened, however, stripper plate 23 is driven toward mold portion 15—as described in my prior U.S. Pat. No. 4,179,254—to entrain the rings 225 and 22 for ejection of the molded workpiece 21.

Figure 4:
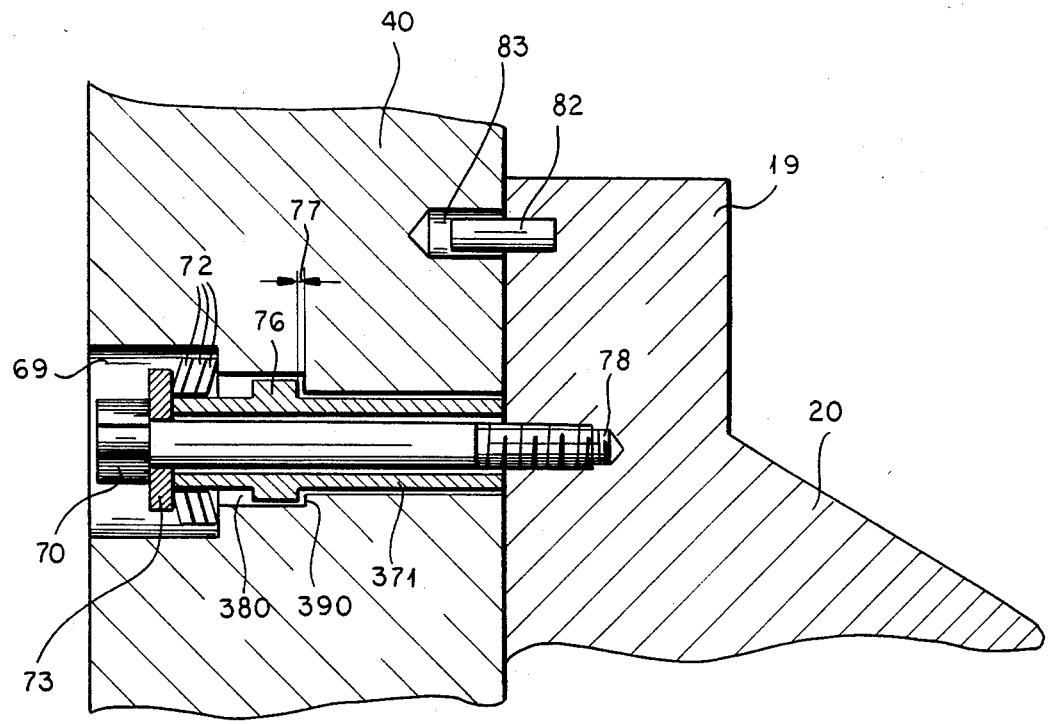

In FIG. 4 I have shown a modification of the aforedescribed fastening devices in which a spacing sleeve 371 is provided with a shoulder 76 confronting a shoulder 390 of a stepped bore 380 with a small separation 77 (on the order of 0.05 mm) which is a fraction of the deformability of the stack of Belleville springs 72 within the recess 69 accommodating the head of bolt 70. These confronting shoulders are designed as backstops preventing any overstressing of springs 72 and leakage of cooling fluid in the event that, on the opening stroke of the mold, core 20 is frictionally retained in its cavity so that its base 19 tends to break away from plate 40; this could occur when a malfunction of the injection system overpacks the mold cavity.

FIG. 4 further shows the sleeve 371 as terminating at the interface of base 19 and plate 40 instead of penetrating into a recess of that base as shown in the preceding Figures. This mold, however, is provided with a number of other locators (only one shown) including dowels 82 which fixedly project rearward from base 19 into slightly larger recesses 83 of plate 40, with lateral play substantially equaling that afforded to sleeves 371 by the respective bores 380 so as to prevent any significant disalignment between the backing plate 40 and the assembly of male mold portion and locking ring. Obviously, the positions of dowels 82 and recesses 83 on base 19 and plate 40 could be interchanged with the same effect.

As will be readily apparent, the modifications described with reference to FIG. 4 could also be utilized in any of the preceding embodiments.

Figures 5, 6:
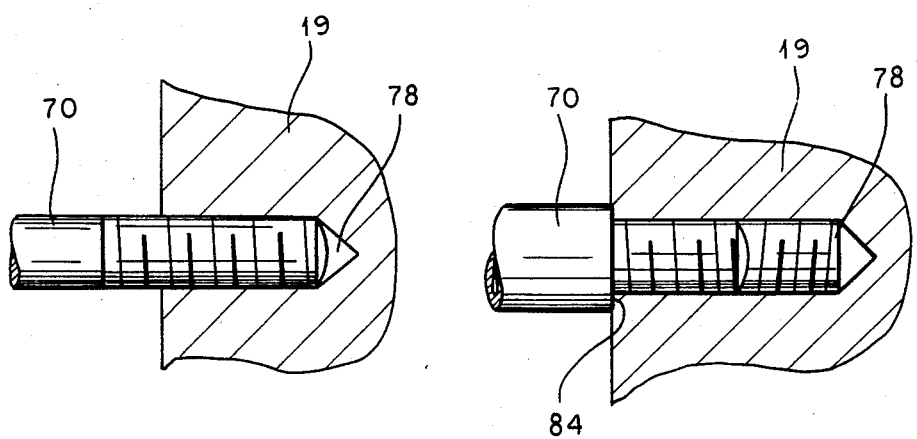
FIGS. 5 and 6 are detail views pertaining to other possible variants.

Sleeves 71 etc. could be eliminated if, instead, the threaded bores 78 etc. were so dimensioned that the heads of the associated bolts 70 etc. would be in the proper position when their stems are fully screwed home into these bores, as illustrated in FIG. 5. An alternatve solution, shown in FIG. 6, resides in the provision of a shoulder 84 on each bolt 70 etc. which again limits the extent to which the bolt may be threaded into its bore. These latter solutions require additional adjustments at the fasteners when the base 19 is to be ground off or a shim is to be introduced for tolerance compensation as described with reference to FIGS. 1 and 2. The elimination of the sleeves, of course, also prevents their utilization as locators and, in the manner described with reference to FIG. 4, as backstops limiting the separation of the core base and/or the locking ring from the backing plate. In the absence of the surrounding sleeves, however, the bolts themselves could be provided with backstepping formations such as shoulders 76.

It will further be understood that, if desired, the female mold portion 15 could be secured to its own backing plate 30 with the aid of similar fastening means enabling a slight relative lateral shifting. My invention, therefore, is applicable to the connection between a backing plate and any mold portion with a slanting surface upon which a camming force with a component parallel to the plate surface is exerted by a surface of a coacting mold portion, in the event of a minor disalignment, when the mold is being closed.

As shown in FIGS. 7 and 8, locking ring 25 of FIG. 1 can be replaced by locking elements 25' in the form of four wedge pieces peripherally secured to the base 19' of a modified mold portion having a core 20'. Wedge pieces 25' are here shown to have outer centering surfaces coacting with an inner centering surface A' of a coacting mold portion 15'. Bolts 70 (only one shown) yieldably retain the unitary assembly 19', 20', 25' on backing palte 40 in the manner described above.

Naturally, the wedge pieces 25' could be provided with inner instead of outer centering surfaces in order to coact with mold portions having outer complementary surfaces, as in the preceding Figures. Conversely, the locking ring included in the aforedescribed embodiments may have an outer centering surface coacting with an inwardly beveled skirt of the opposite mold portion.

I claim:

1. In a workpiece-forming machine provided with two relatively movable platens, a first forming tool on one of said platens, a second forming tool on the other of said platens, said forming tools being mutually complementary to define a cavity between them in a closure position, and locking means on said one of said platens closely adjoining said first forming tool to form therewith a centering assembly insuring alingment of said forming tools with each other in said closure position in which a beveled centering surface of said locking means engages a complementarily beveled centering surface of said second forming tool, the combination therewith of:
a backing plate fixedly mounted on said one of said platens for supporting said assembly; and
fastening means securing said assembly to said backing plate with limited lateral shiftability relative thereto, said fastening means comprising a plurality of bolts each passing with clearance through a respective bore in said backing plate and engaging said assembly with a tight fit, said bolts projecting from a surface of said backing plate remote from said assembly and having heads separated from said surface by resilient means tending to draw said assembly onto said backing plate.

2. The combination defined in claim 1 wherein said bolts are surrounded within said bores by spacing sleeves compressed between said heads and a face of said assembly to establish said tight fit.

3. The combination defined in claim 2 wherein said face has recesses tightly receiving adjoining ends of said spacing sleeves.

4. The combination defined in claim 2 wherein said spacing sleeves and said bores are provided confronting shoulders limiting a possible separation of said face from said backing plate to a fraction of the range of deformability of said resilient means.

5. The combination defined in claim 1 wherein said resilient means comprise at least one Belleville spring per bolt.

6. The combination defined in claim 1 wherein said first forming tool comprises a mold portion with a tapering core surrounded by a stripper ring movable relatively thereto for the ejection of a workpiece molded in said cavity.

7. The combination defined in claim 6 wherein said locking means is secured to said stripper plate by other fastening means substantially identical with the fastening means securing said mold portion to said backing plate.

8. The combination defined in claim 6 wherein said core has a stepped base supporting said locking means in a position surrounding said stripper ring, said base having throughgoing bores aligned with the bores of said backing plate respectively receiving said bolts, the latter passing with clearance through the aligned bores and being screwed into threaded bores of said locking means.

9. The combination defined in claim 8 wherein said bolts are surrounded within the bores of said backing plate by spacing sleeves with ends closely fitted into recesses of said base and with opposite ends under pressure from said heads to establish said tight fit.

10. The combination defined in claim 1 wherein said locking means comrpises an annular member surrounding said first forming tool.

11. The combination defined in claim 1 wherein said locking means comprises a plurality of wedge pieces peripherally secured to said first forming tool.

12. In a workpiece-forming machine provided with two relatively movable platens, a first forming tool carried by a first backing plate on one of said platens, and a second forming tool carried by a second backing plate on the other of said platens, said forming tools being mutually complementary to define a cavity between them in a closure position and being provided with coacting surfaces exerting upon each other a camming force with a component parallel to said backing plates upon approaching each other in a position of minor relative disalignment, the combination therewith of fastening means securing at least said first forming tool to said first backing plate with limited lateral shiftability relative thereto, said fastening means comprising a plurality of bolts each passing with clearance through a respective bore in said first backing plate and engaging said first forming tool with a tight fit, said bolts projecting from a surface of said first backing plate remote from said first forming tool and having heads separated from said remote surface by resilient means tending to draw said first forming tool onto said first backing plate.

13. The combination defined in claim 12 wherein said bolts are surrounded within said bores by spacing sleeves compressed between said heads and a face of said first forming tool to establish said tight fit.

14. An injection-molding machine comprising two relatively movable platens, a first mold portion on one of said platens, a second mold portion on another of said platens, said mold portions being mutually complementary to define a cavity between them in a mold-closed position, means on one of said platens cooperating with said first mold portion to form therewith an assembly ensuring alingment of said mold portions with each other in said mold-closed position, and fastening means secured to said assembly and operative to provide said assembly with limited shiftability in a direction laterlly relative to the direction of said alignment, said fastening means including axially effective elastic means operative to force said assembly in a direction of said alignment and dimensioned to resist shifting in said direction laterlly of said direction of alignment but with a force overcome by said means assuring alignment.

15. An injection-molding machine as defined in claim 14 wherein said means cooperating with said first mold portion forms there with an assembly in which a surface of said means cooperating with said first mold portion engages a complementary surface of said second mold portion in said mold-closed position.

16. An injection-molding machine defined in claim 14 wherein said elastic means engages said assembly with a tight fit.

17. An injection-molding machine defined in claim 14 further including a backing plate fixedly mounted on one of said platens for supporting said assembly, said elastic means forming part of a securing means projecting from a surface of said backing plate remote from said assembly and including resilient means operative to draw said assembly onto said backing plate.

* * * * *